(12) United States Patent
Wang et al.

(10) Patent No.: US 11,256,643 B2
(45) Date of Patent: Feb. 22, 2022

(54) SYSTEM AND METHOD FOR HIGH CONFIGURABILITY HIGH-SPEED INTERCONNECT

(71) Applicant: DELL PRODUCTS, LP, Round Rock, TX (US)

(72) Inventors: Isaac Qin Wang, Austin, TX (US); Duk M. Kim, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/449,134

(22) Filed: Jun. 21, 2019

(65) Prior Publication Data
US 2020/0401544 A1   Dec. 24, 2020

(51) Int. Cl.
*G06F 13/40* (2006.01)
*G06F 13/42* (2006.01)

(52) U.S. Cl.
CPC ...... *G06F 13/4022* (2013.01); *G06F 13/4282* (2013.01); *G06F 2213/0026* (2013.01)

(58) Field of Classification Search
CPC ............. G06F 13/4022; G06F 13/4282; G06F 2213/0026
See application file for complete search history.

(56) References Cited

U.S. PATENT DOCUMENTS

| | | | |
|---|---|---|---|
| 8,463,881 B1 * | 6/2013 | Baker | H04L 29/06 709/220 |
| 9,870,334 B2 | 1/2018 | Hartman et al. | |
| 10,140,238 B2 | 11/2018 | Mundt et al. | |
| 10,445,279 B1 * | 10/2019 | Itkin | G06F 9/44505 |
| 10,585,827 B1 * | 3/2020 | Cannata | G06F 13/4221 |
| 2005/0240703 A1 * | 10/2005 | Nguyen | G06F 13/405 710/301 |
| 2009/0157920 A1 * | 6/2009 | Foster, Sr. | G06F 13/409 710/62 |
| 2012/0260015 A1 * | 10/2012 | Gay | G06F 13/409 710/301 |
| 2013/0031288 A1 * | 1/2013 | Richard | G06F 13/4022 710/301 |
| 2015/0177813 A1 | 6/2015 | Bailey et al. | |
| 2015/0347345 A1 * | 12/2015 | Hellriegel | G06F 13/409 710/301 |

(Continued)

*Primary Examiner* — Eric T Oberly
(74) *Attorney, Agent, or Firm* — Larson Newman, LLP (57) ABSTRACT

An information handling system includes first and second devices, a connectivity switch, and a baseboard management controller. The first and second devices are configured to communicate with first and second processors of the information handling system. The connectivity switch is connected between the first and second devices and the first and second processors. The connectivity switch operates in one of a plurality of configurations including a first configuration, a second configuration, and a third configuration. Each of the configurations provides a different connectivity between the first device, the second device, the first processor, and the second processor. The baseboard management controller determines a setup of the first and second devices, and provides a connectivity indication signal to the connectivity switch based on the setup of the first and second devices. The connectivity indication signal identifies one of the configurations for the connectivity switch.

16 Claims, 7 Drawing Sheets

(56) References Cited

U.S. PATENT DOCUMENTS

| | | | |
|---|---|---|---|
| 2016/0267041 A1* | 9/2016 | Jose | G06F 1/3253 |
| 2016/0328344 A1* | 11/2016 | Jose | G06F 13/4022 |
| 2017/0068636 A1* | 3/2017 | Vishwanathan | G06F 13/16 |
| 2018/0052793 A1* | 2/2018 | Fang | H04L 12/4633 |
| 2018/0356112 A1 | 12/2018 | Lin et al. | |

* cited by examiner

SYSTEM AND METHOD FOR HIGH CONFIGURABILITY HIGH-SPEED INTERCONNECT

FIELD OF THE DISCLOSURE

The present disclosure generally relates to information handling systems, and more particularly relates to a system with a high configurability high-speed interconnect.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes first and second devices, a connectivity switch, and a baseboard management controller (BMC). The first and second devices are configured to communicate with first and second processors of the information handling system. The connectivity switch is connected between the first and second devices and the first and second processors. The connectivity switch operates in one of a plurality of configurations including a first configuration, a second configuration, and a third configuration. Each of the configurations provides a different connectivity between the first device, the second device, the first processor, and the second processor. The BMC determines a setup of the first and second devices, and provides a connectivity indication signal to the connectivity switch based on the setup of the first and second devices. The connectivity indication signal identifies one of the configurations for the connectivity switch.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

FIGS. 1-5 show a portion of an information handling system 100 including a riser portion 102 and a planar portion 104. Within riser portion 102, information handling system 100 includes a connectivity switch 110, devices 112 and 114 in communication with the connectivity switch, and a controller 116. Within planar portion 104, information handling system 100 includes a baseboard management controller (BMC) 120, processor 122 and 124, and a storage device 126. In an example, storage device 126 may store a configuration map 128 associated with devices 112 and 114. In an example, controller 116 may be any suitable type of controller, such as a microcontroller. In an example, BMC 120 may be any suitable type of controller, such as a BMC in accordance with an Intelligent Platform Management Interface (IPMI) specification, an Integrated Dell Remote Access Controller (iDRAC), or the like. In an example, connectivity switch 110 may reside on planar portion 104 instead of riser portion 102 without varying from the scope of the disclosure.

Information handling system 100 may include additional components (not shown in FIG. 1), without varying from the scope of this disclosure. One of ordinary skill in the art will recognize that while FIGS. 1-4 illustrate devices 112 and 114, this disclosure is not limited to two devices, two processors, and a single connectivity switch but can be applied to any number of devices, processors, and connectivity switches (as shown in FIG. 5). In an embodiment, devices 112 and 114 may be any suitable device type using any suitable communication protocol including, but not limited to, a Peripheral Component Interconnect Express (PCIe) device, a field programmable gate array (FPGA) device, a Gen-Z device, an OpenCAPI device, and cache coherent interconnect for accelerators (CCIX) device.

Figure 1:
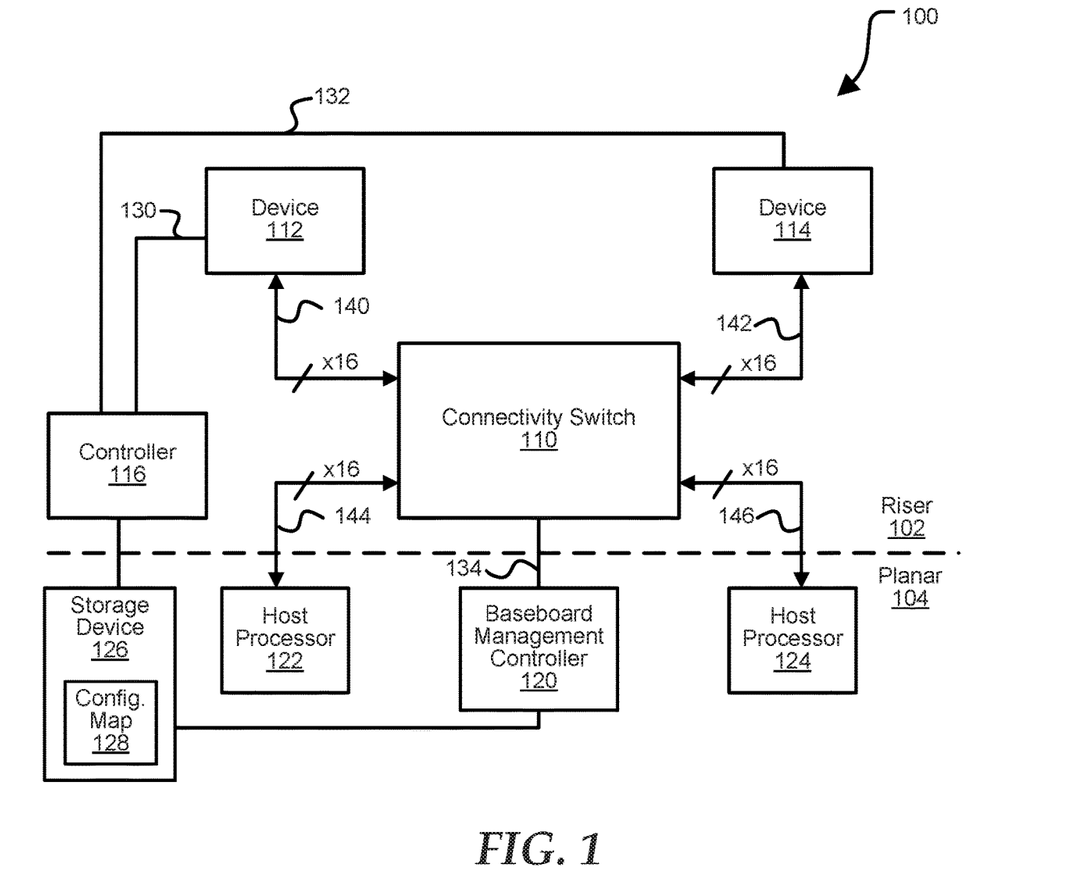
FIGS. 1-5 are block diagrams of a portion of an information handling system according to at least one embodiment of the disclosure.

During operation, controller 116 may utilize communication channel 130 to communicate with device 112 and communication channel 132 to communicate with device 114. In an example, communication channels 130 and 132 may be any suitable type of channels including, but not limited to, a side-band communication channel. Based on the communication between controller 116 and devices 112 and 114, the controller may determine a setup of the devices. In an example, the setup of device 112 and 114 may be the device type of the devices. In an embodiment, controller 116 stores data associated with the setup of device 112 and 114 in configuration map 128 of storage device 126. In an example, storage device 126 may be any suitable type of computer memory, such as a complex programmable logic device (CPLD).

In an embodiment, BMC 120 accesses configuration map 128 to retrieve the setup of devices 112 and 114. Based on the setup of device 112 and 114, BMC 120 may determine a particular configuration for connectivity switch 110, such that communications between the devices and processors 122 and 124 may be efficiently divided over communication links 140, 142, 144, and 146 of riser 102 as shown in FIG. 1. In an example, riser 102 may be a printed circuit board (PCB) with a predefined layout to provide two separate links of predefined widths, such as x16 width for each link. In an example, links 140 and 144 may be a single x16 link provided by riser 102 between device 112 and processor 122. Similarly, links 142 and 146 may be a separate single x16 link provided by riser 102 between device 112 and processor 122.

In an example, BMC 120 may create a connectivity signal to indicate a particular configuration for connectivity switch 110. In an example, the configurations of connectivity switch 110 each have different internal routing of connection within the connectivity switch to control if and how the predefined links 140, 142, 144, and 146 of riser 102 are bifurcated to improve communication between devices 112 and 114 and processors 122 and 124. In an embodiment, BMC 120 provides the connectivity signal to connectivity switch 110 via the channel or bus 134. In an example, bus 134 may be any suitable type of bus including, but not limited to, a system management bus (SMBus). In response to receiving the connectivity signal, connectivity switch 110 may be configured and operated one of plurality of configurations as will be discussed with respect to FIGS. 2-5 below.

Figure 2:
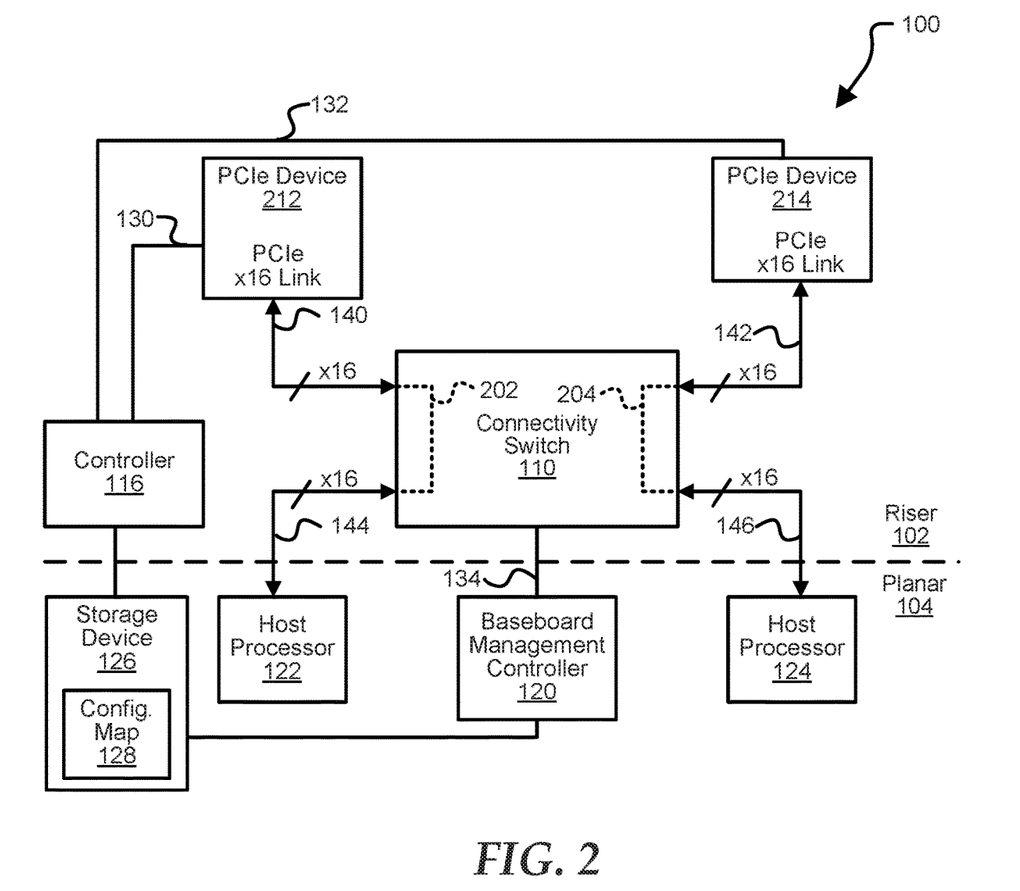

Referring now to FIG. 2, devices 112 and 114 may be respectively PCIe devices 212 and 214. In this embodiment, controller 116 stores the setup of devices 212 and 214 within configuration map 128. In an embodiment, the setup of devices 212 and 214 includes the device type, including a communication protocol for the devices, and pinout configurations for the devices. For example, controller 116 may store PCIe as the device type for each device 212 and 214 and may store x16 as the link width associated with the device within configuration map 128.

In an example, BMC 120 may access configuration map 128 to retrieve the setup of devices 212 and 214. Based on the setup of devices 212 and 214, BMC 120 may create a particular connectivity signal to indicate how connectivity switch should be configured. BMC 120 may provide the created connectivity signal to connectivity switch 110. In an embodiment, the created connectivity signal causes connectivity switch 110 to be configured and operated in a first configuration.

In an embodiment of a first configuration, connectivity switch 110 provides an internal link 202 between link 140 from device 212 and link 144 from processor 122, and an internal link 204 between link 142 from device 214 and link 146 from processor 124. In an example, connectivity switch 110 may include any suitable components, such as switches, relays, multiplexers, or the like, to configure internal links, such as links 202 and 204, within the connectivity switch. Thus, while in the first configuration, connectivity switch 110 may provide a single link between device 212 and processor 122 via links 140, 202 and 144, and this link may be allocated the entire link width, such as an x16 width.

Similarly, while in the first configuration, connectivity switch 110 may provide a single link between device 214 and processor 124 via links 142, 204 and 146, and this link may be allocated the entire link width, such as an x16 width.

Figure 3:
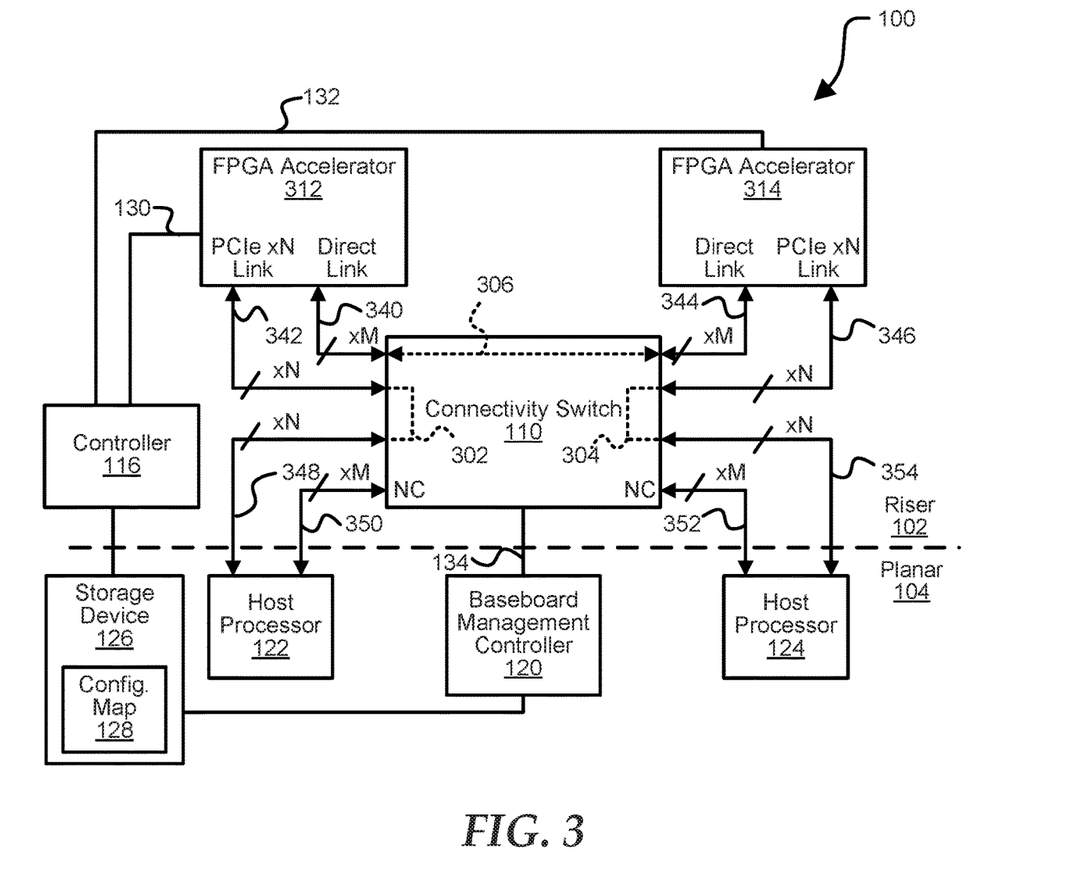

Referring now to FIG. 3, devices 112 and 114 (shown in FIG. 1) may be respectively FPGA devices 312 and 314, such as FPGA accelerators. In an embodiment, devices 312 and 314 may include a direct link portion and a PCIe link portion of their respective pinouts. In this embodiment, controller 116 stores the setup of devices 312 and 314 within configuration map 128. In an embodiment, the setup of devices 312 and 314 includes the device type, including a communication protocol for the devices, and pinout configurations for the devices. For example, controller 116 may store FPGA as the device type for each device 312 and 314, PCIe as the communication protocol, an xM link width for a direct interconnect between the devices, and an xN link width for communication from the devices to processors 122 and 124. In an example, the xN link width may be utilized to provide N lanes for processor-to-device communications, such as workload management communications. In certain examples, the bandwidth needed for the processor-to-device communications may be significantly less than the bandwidth needed for communications between devices 312 and 314. In these examples, controller 116 may store, in configuration map 128, that the xM link between devices 312 and 314 be M lanes, that the xN link between devices 312 and 314 be N lanes. In an example, an x1 link width may be sufficient for the xN link, such that an x15 link width may be provided to the xM link.

In an example, BMC 120 may access configuration map 128 to retrieve the setup of devices 312 and 314. Based on the setup of devices 312 and 314, BMC 120 may create a particular connectivity signal to indicate how connectivity switch should be configured. BMC 120 may provide the created connectivity signal to connectivity switch 110. In an embodiment, the connectivity signal causes connectivity switch 110 to be configured and operated in a second configuration.

In an embodiment of a second configuration, connectivity switch 110 provides an internal link 302 between device 312 and processor 122, a link 304 between device 314 and processor 124, and a link 306 between the devices. In an example, the internal links 302, 304, and 306 cause both of the predefined links in PCB of riser 102 to be bifurcated. For example, the link formed by links 140 and 144, shown in FIGS. 1 and 2, may be split, such that link 140 is now represented as links 340 and 342, link 142 is now represented as links 344 and 346, link 144 is now represented as links 348 and 350, and link 146 is now represented as links 352 and 354. In an embodiment, each of the link portions, such as links 340, 342, 344, 346, 348, 350, 352, and 354, may be allocated with a proper width based on connectivity switch 110 configuring the internal links 302, 304, and 306 with the widths indicated by the connectivity signal.

In an embodiment, while in the second configuration, connectivity switch 110 may provide a link between devices 312 and 314 via links 340, 306, and 344, and this link may be allocated an xM link width, such as an x15 width. Also, while in the second configuration, connectivity switch 110 may provide a link between device 312 and processor 122 via links 342, 302 and 348, and this link may be allocated an xN link width, such as an x1 width. Similarly, while in the second configuration, connectivity switch 110 may provide a link between device 314 and processor 124 via links 346, 304 and 354, and this link may be allocated an xN link width, such as an x1 width. Additionally, while in the second configuration, connectivity switch 110 may configure a no connect (NC) within the connectivity switch for both link 350 from processor 122 and link 352 from processor 124. Thus, the second configuration of connectivity switch 110 may improve performance of information handling system 100 by optimizing latency and bandwidth within the direct link between devices 312 and 314.

Figure 4:
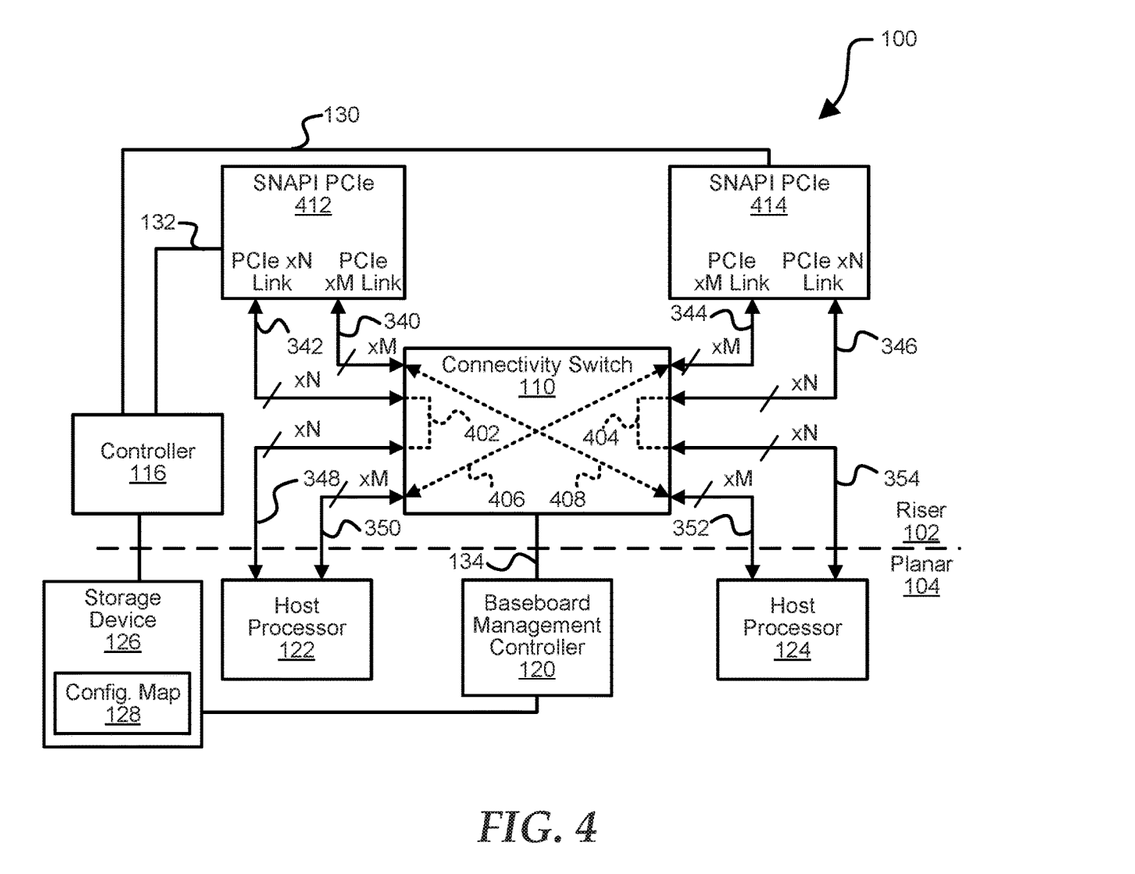
Figure 5:
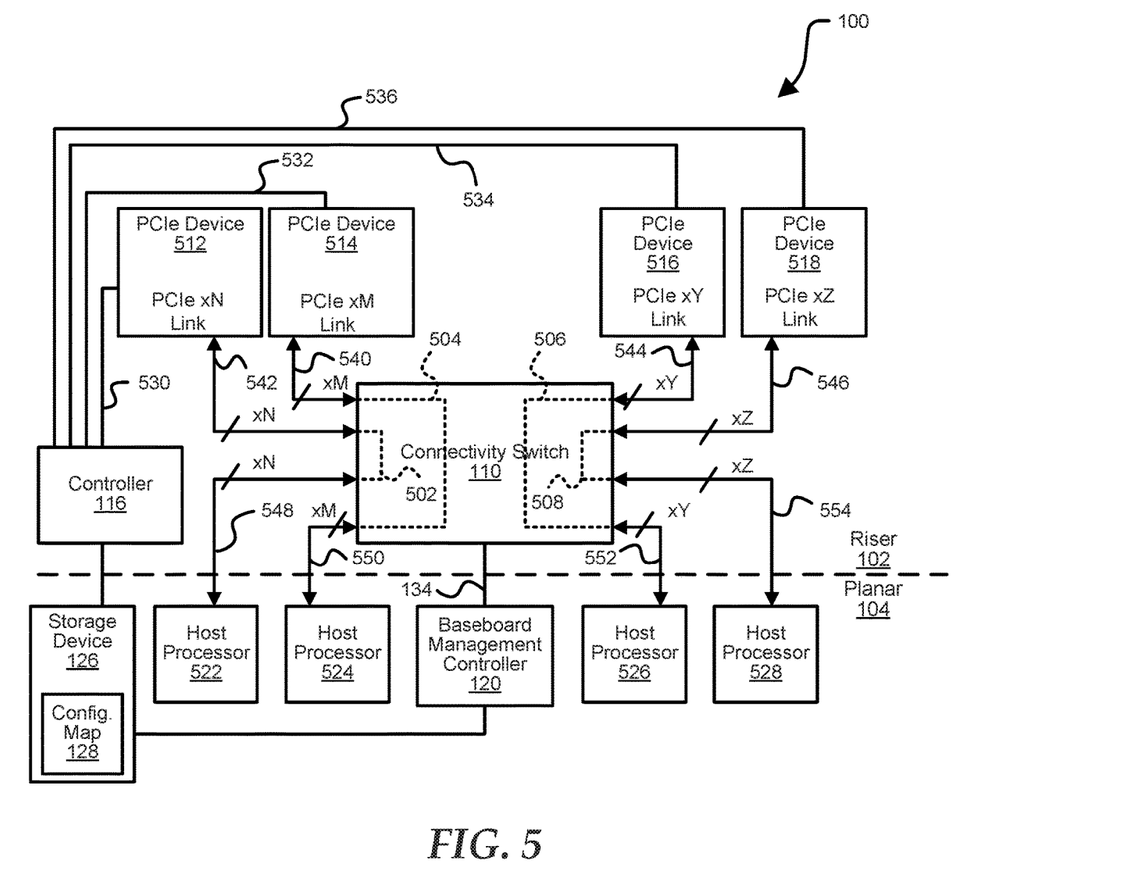

Referring now to FIG. 4, devices 112 and 114 (shown in FIG. 1) may be respectively special needs application program interface (SNAPI) devices 412 and 414, such as SNAPI PCIe devices. In an embodiment, devices 412 and 414 may include a first pinout portion to communicate with processor 122 and a second pinout portion to communicate with processor 124. In this embodiment, controller 116 stores the setup of devices 412 and 414 within configuration map 128. In an embodiment, the setup of devices 412 and 414 includes the device type, including a communication protocol for the devices, and pinout configurations for the devices. For example, controller 116 may store SNAPI as the device type for both devices 412 and 414, PCIe as the communication protocol, an xM link width for a first communication link, and an xN link width for a second communication link.

In an example, the xM link width may be utilized to provide M lanes for processor-to-device communications, such as between processor 124 and device 412, and between processor 122 and device 414. In an example, the xN link width may be utilized to provide N lanes for processor-to-device communications, such as between processor 122 and device 412, and between processor 124 and device 414. In certain examples, the bandwidth needed for communications may vary depending on devices 412 and 414. In an example, controller 116 may store, in configuration map 128, that the M lanes of the xM links be substantially the same as the N lanes of the xN links, such as 8 lanes for each link. In another example, controller 116 may store, in configuration map 128, that the M lanes of the xM links be different than the N lanes of the xN links, such as 6 lanes for the xM links and 10 lanes for the xN links.

In an example, BMC 120 may access configuration map 128 to retrieve the setup of devices 412 and 414. Based on the setup of devices 412 and 414, BMC 120 may create a particular connectivity signal to indicate how connectivity switch should be configured. BMC 120 may provide the created connectivity signal to connectivity switch 110. In an embodiment, the connectivity signal causes connectivity switch 110 to be configured and operated in a third configuration.

In an embodiment of a third configuration, connectivity switch 110 provides an internal link 402 between device 412 and processor 122, a link 404 between device 414 and processor 124, a link 406 between device 414 and processor 122, and a link 408 between device 412 and processor 124. In an example, the internal links 402, 404, 406, and 408 cause both of the predefined links in PCB of riser 102 to be bifurcated. For example, as described above with respect to FIG. 3, the link formed by links 140 and 144, shown in FIGS. 1 and 2, may be split, such that link 140 is now represented as links 340 and 342, link 142 is now represented as links 344 and 346, link 144 is now represented as links 348 and 350, and link 146 is now represented as links 352 and 354. In an embodiment, each of the link portions, such as links 340, 342, 344, 346, 348, 350, 352, and 354, may be allocated with a proper width based on connectivity switch 110 configuring the internal links 402, 404, 406, and 408 with the widths indicated by the connectivity signal.

In an embodiment, while in the third configuration, connectivity switch 110 may provide a link between device 412 and processor 124 via links 340, 408, and 352, and this link may be allocated an xM link width, such as an x8 width. Also, while in the third configuration, connectivity switch 110 may provide a link between device 412 and processor 122 via links 342, 402, and 348, and this link may be allocated an xN link width, such as an x8 width. Similarly, while in the third configuration, connectivity switch 110 may provide a link between device 414 and processor 122 via links 344, 406, and 350, and this link may be allocated an xM link width, such as an x8 width. Also, while in the third configuration, connectivity switch 110 may provide a link between device 414 and processor 124 via links 346, 404, and 354, and this link may be allocated an xN link width, such as an x8 width. Thus, the third configuration of connectivity switch 110 may improve performance of information handling system 100 by enabling the predefined links of the PCB for riser 102 to be bifurcated to allow devices 412 and 414 to communicate with both processors 122 and 124 even though the predefined links may not have been routed in this configuration.

Referring now to FIG. 5, information handling system 100 may include more than two PCIe devices 512, 514, 516, and 518 and more that two host processors 522, 524, 526, and 528. In this embodiment, controller 116 stores the setup of devices 522, 524, 526, and 528 within configuration map 128. In an embodiment, the setup of devices 522, 524, 526, and 528 includes the device type, including a communication protocol for the devices, and pinout configurations for the devices. For example, controller 116 may store PCIe as the device type for each device 522, 524, 526, and 528 and may store variable link widths (xM, xN, xY, and xZ) as the link width associated with the device within configuration map 128.

In an example, BMC 120 may access configuration map 128 to retrieve the setup of devices 522, 524, 526, and 528. Based on the setup of devices 522, 524, 526, and 528, BMC 120 may create a particular connectivity signal to indicate how connectivity switch should be configured. BMC 120 may provide the created connectivity signal to connectivity switch 110. In an embodiment, the created connectivity signal causes connectivity switch 110 to be configured and operated in a first configuration.

In an embodiment of a fourth configuration, connectivity switch 110 provides an internal link 502 between link 542 from device 512 and link 548 from processor 522, an internal link 504 between link 540 from device 514 and link 550 from processor 524, an internal link 506 between link 544 from device 516 and link 552 from processor 526, and an internal link 508 between link 546 from device 518 and link 554 from processor 528. In an example, connectivity switch 110 may include any suitable components, such as switches, relays, multiplexers, or the like, to configure internal links, such as links 502, 504, 506, and 508, within the connectivity switch.

While in the fourth configuration, connectivity switch 110 may provide a link between device 512 and processor 522 via links 542, 502, and 548, and this link may be allocated an xN link width, such as an x8 width. Also, while in the fourth configuration, connectivity switch 110 may provide a link between device 514 and processor 524 via links 540, 504, and 550, and this link may be allocated an xM link width, such as an x8 width. Similarly, while in the fourth configuration, connectivity switch 110 may provide a link between device 516 and processor 526 via links 544, 506, and 552, and this link may be allocated an xY link width, such as an x10 width. Also, while in the fourth configuration, connectivity switch 110 may provide a link between device 518 and processor 528 via links 546, 508, and 554, and this link may be allocated an xZ link width, such as an x6 width. Thus, the fourth configuration of connectivity switch 110 may improve performance of information handling system 100 by enabling the predefined links of the PCB for riser 102 to be bifurcated to allow devices 512, 514, 516, and 518 to communicate with both processors 522, 524, 526, and 528 even though the predefined links may not have been routed in this configuration. In an example, an x16 width link may be divided in any suitable manner to allocate any suitable the link widths xM and xN. Similarly, in an example, an x16 width link may be divided in any suitable manner to allocate any suitable the link widths xY and xZ.

Figure 6:
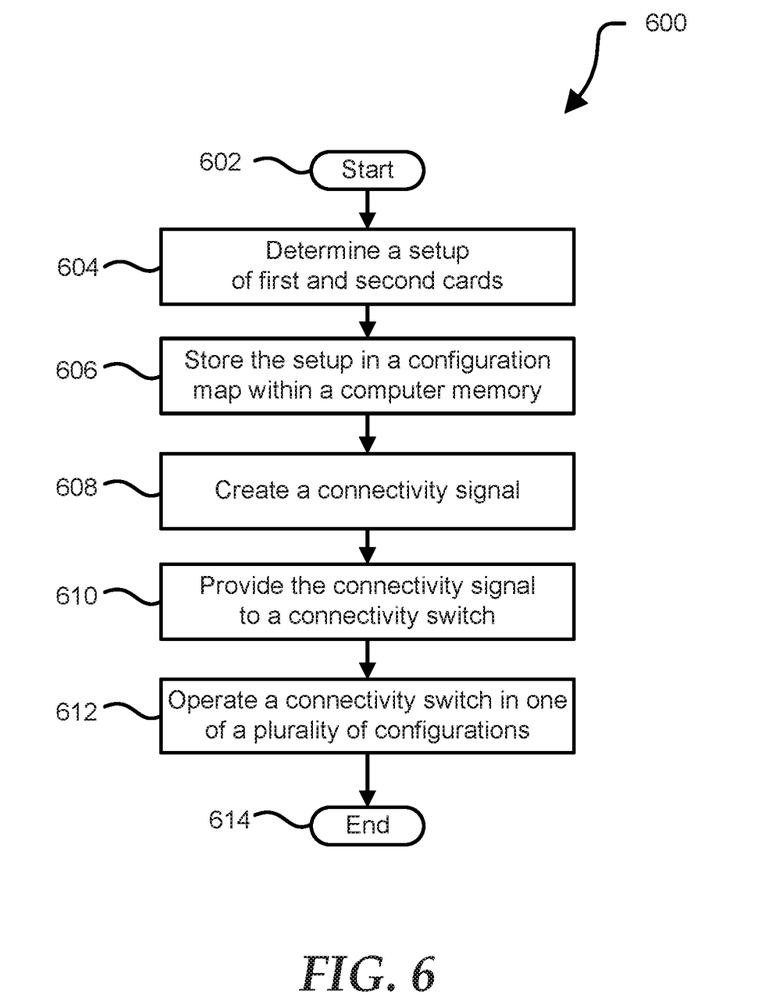
FIG. 6 is a flow diagram illustrating a method for controlling the configuration of a connectivity switch based devices connected to the information handling system according to at least one embodiment of the disclosure.

FIG. 6 is a flow diagram illustrating a method 600 for configuring a connectivity switch within an information handling system, starting at block 602. It will be readily appreciated that not every method step set forth in this flow diagram is always necessary, and that certain steps of the methods can be combined, performed simultaneously, in a different order, or perhaps omitted, without varying from the scope of the disclosure. At block 604, a setup of both a first device and a second device is determined. For example, a controller of an information handling system may communicate with both of the first and second devices to determine a device type for the first and second devices. In an example, the device type may be any suitable device type to be inserted within an information handling system including, but not limited to, a PCIe device, a FPGA device, a Gen-Z device, an OpenCAPI device, and CCIX device.

At block 606 the setup is stored in a configuration map within a computer memory. At block 608 a connectivity signal is created. For example, a BMC may access the configuration map and create a connectivity signal based on the setup of the first and second devices. At block 610 the connectivity signal is provided to a connectivity switch. At block 612, the connectivity switch is operated in one of a plurality of configurations based on the connectivity signal. For example, the connectivity switch may be operated in a first, second, or third configuration. In an embodiment, in response to the connectivity switch being in the first configuration, the connectivity switch provides only a single link between the first device and the first processor and a single link between the second device and the second processor. In response to the connectivity switch being in the second configuration, the connectivity switch provides a direct link between the first device and the second device, a first link between the first device and the first processor, and a second link between the second device and the second processor. In response to the connectivity switch being in the third configuration, the connectivity switch provides a first link between the first device and the second processor, a second link between the second device and the first processor, a third link between the first device and the first processor, and a fourth link between the second device and the second processor. The method ends in block 614.

Figure 7:
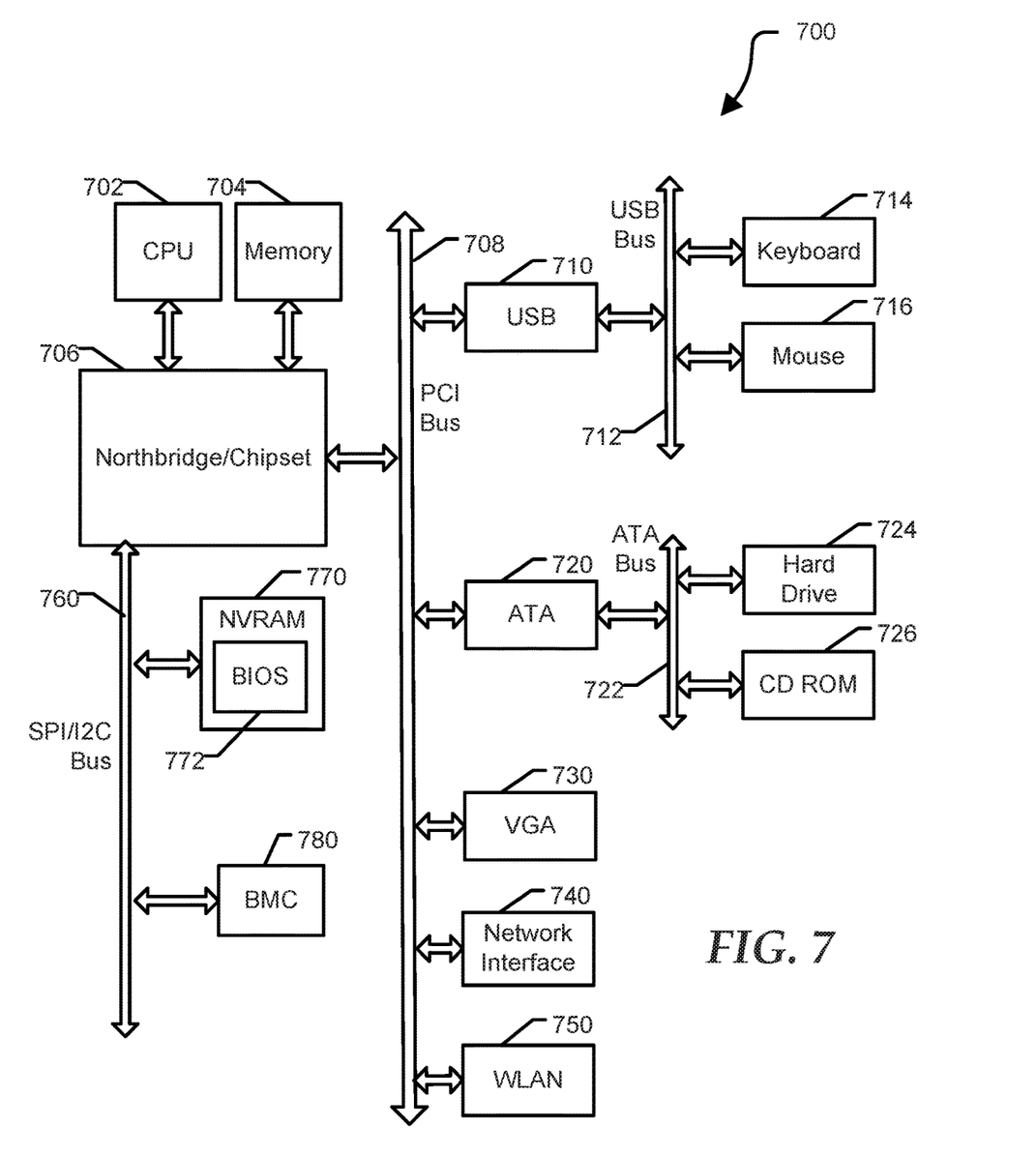
FIG. 7 is a block diagram of a general information handling system according to at least one embodiment of the disclosure.

FIG. 7 illustrates a general information handling system 700 including a processor 702, a memory 704, a northbridge/chipset 706, a PCI bus 708, a universal serial bus (USB) controller 710, a USB 712, a keyboard device controller 714, a mouse device controller 716, a configuration an ATA bus controller 720, an ATA bus 722, a hard drive device controller 724, a compact disk read only memory (CD ROM) device controller 726, a video graphics array (VGA) device controller 730, a network interface controller (NIC) 740, a wireless local area network (WLAN) controller 750, a serial peripheral interface (SPI) bus 760, a NVRAM 770 for storing BIOS 772, and a baseboard management controller (BMC) 780. In an embodiment, information handling system 700 may be information handling system 100 of FIGS. 1-5. BMC 780 can be referred to as a service processor or embedded controller (EC). Capabilities and functions provided by BMC 780 can vary considerably based on the type of information handling system. For example, the term baseboard management system is often used to describe an embedded processor included at a server, while an embedded controller is more likely to be found in a consumer-level device. As disclosed herein, BMC 780 represents a processing device different from CPU 702, which provides various management functions for information handling system 700. For example, an embedded controller may be responsible for power management, cooling management, and the like. An embedded controller included at a data storage system can be referred to as a storage enclosure processor.

For purpose of this disclosure information handling system 700 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 700 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 700 can include processing resources for executing machine-executable code, such as CPU 702, a programmable logic array (PLA), an embedded device such as a System-on-a-Chip (SoC), or other control logic hardware. Information handling system 700 can also include one or more computer-readable medium for storing machine-executable code, such as software or data.

System 700 can include additional processors that are configured to provide localized or specific control functions, such as a battery management controller. Bus 760 can include one or more busses, including a SPI bus, an I2C bus, a system management bus (SMBUS), a power management bus (PMBUS), and the like. BMC 780 can be configured to provide out-of-band access to devices at information handling system 700. As used herein, out-of-band access herein refers to operations performed prior to execution of BIOS 772 by processor 702 to initialize operation of system 700.

BIOS 772 can be referred to as a firmware image, and the term BIOS is herein used interchangeably with the term firmware image, or simply firmware. BIOS 772 includes instructions executable by CPU 702 to initialize and test the hardware components of system 700, and to load a boot loader or an operating system (OS) from a mass storage device. BIOS 772 additionally provides an abstraction layer for the hardware, such as a consistent way for application programs and operating systems to interact with the keyboard, display, and other input/output devices. When power is first applied to information handling system 700, the system begins a sequence of initialization procedures. During the initialization sequence, also referred to as a boot sequence, components of system 700 are configured and enabled for operation, and device drivers can be installed.

Device drivers provide an interface through which other components of the system 700 can communicate with a corresponding device.

Information handling system 700 can include additional components and additional busses, not shown for clarity. For example, system 700 can include multiple processor cores, audio devices, and the like. While a particular arrangement of bus technologies and interconnections is illustrated for the purpose of example, one of ordinary skill in the art will appreciate that the techniques disclosed herein are applicable to other system architectures. System 700 can include multiple CPUs and redundant bus controllers. One or more components can be integrated together. For example, portions of northbridge/chipset 706 can be integrated within CPU 702. Additional components of information handling system 700 can include one or more storage devices that can store machine-executable code, one or more communications ports for communicating with external devices, and various input and output (I/O) devices, such as a keyboard, a mouse, and a video display. For example, device controller 730 may provide data to a display device 790 to visually present the information to an individual associated with information handling system 700. An example of information handling system 700 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 700 can include a set of instructions that can be executed to cause the information handling system to perform any one or more of the methods or computer based functions disclosed herein. The information handling system 700 may operate as a standalone device or may be connected to other computer systems or peripheral devices, such as by a network.

In a networked deployment, the information handling system 700 may operate in the capacity of a server or as a client user computer in a server-client user network environment, or as a peer computer system in a peer-to-peer (or distributed) network environment. The information handling system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single information handling system 700 is illustrated, the term "system" shall also be taken to include any collection of systems or sub-systems that individually or jointly execute a set, or multiple sets, of instructions to perform one or more computer functions.

The information handling system 700 can include a disk drive unit and may include a computer-readable medium, not shown in FIG. 7, in which one or more sets of instructions, such as software, can be embedded. Further, the instructions may embody one or more of the methods or logic as described herein. In a particular embodiment, the instructions may reside completely, or at least partially, within system memory 704 or another memory included at system 700, and/or within the processor 702 during execution by the information handling system 700. The system memory 704 and the processor 702 also may include computer-readable media.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a processor or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system, comprising:
   a planar portion including:
     first and second processors; and
     a baseboard management controller; and
   a riser printed circuit board having a predefined layout of first and second physical communication links with predefined widths, the riser printed circuit board including:
     first and second devices configured to communicate with the first and second processors, the first device to communicate via the first physical communication link and the second device to communicate via the second physical communication link;
     a connectivity switch connected between the first and second devices and the first and second processors, the connectivity switch configured to operate in one of a plurality of configurations, the plurality of configuration includes a first configuration, a second configuration, and a third configuration, wherein each of the configurations provides different internal routing of connections in the connectivity switch for different connectivity between the first device, the second device, the first processor, and the second processor, wherein the first configuration of the connectivity switch provides a single link between the first device and the first processor and a single link between the second device and the second processor without any other links, wherein the second configuration of the connectivity switch provides a direct link between the first device and the second device, a first link between the first device and the first processor, and a second link between the second device and the second processor; and
     the baseboard management controller to communicate with the connectivity switch, the baseboard management controller to:
       determine a setup of the first and second devices; and
       provide a connectivity indication signal to the connectivity switch based on the setup of the first and second devices, wherein the connectivity indication signal identifies one of the configurations for the connectivity switch.

2. The information handling system of claim 1, further comprising:
   a controller to determine a device type of the first and second devices, and to store the device type in a configuration map of a computer memory.

3. The information handling system of claim 2, wherein the baseboard management controller is further configured to:
   receive the device type of the first and second devices from the controller, wherein the device type is part of the setup of the first and second devices; and
   create the connectivity indication signal based on the device type of the first and second devices.

4. The information handling system of claim 1, wherein the third configuration of the connectivity switch provides a first link between the first device and the second processor, a second link between the second device and the first processor, a third link between the first device and the first processor, and a fourth link between the second device and the second processor.

5. The information handling system of claim 1, wherein the first and second devices are peripheral component interconnect express devices.

6. The information handling system of claim 1, wherein the first and second devices are field programmable gate array devices.

7. The information handling system of claim 1, wherein the first and second devices are special needs application program interface peripheral component interconnect express devices.

8. A method, comprising:
   determining, by a baseboard management controller of an information handling system, a setup of first and second devices connected to the information handling system;
   providing, by the baseboard management controller, a connectivity indication signal to a connectivity switch of the information handling system, wherein the connectivity indication signal is based on the setup of the first and second devices;
   operating the connectivity switch in one of a plurality of configurations based on the connectivity signal, the plurality of configuration includes a first configuration, a second configuration, and a third configuration, wherein each of the configurations provides different internal routing of connections in the connectivity switch for different connectivity between the first device, the second device, a first processor of the information handling system, and a second processor of the information handling system, wherein each of the configurations provides a different bifurcation of first and second physical communication links on a riser printed circuit board of the information handling system for communication among the first device, the second device, the first processor, and the second processor, wherein the riser printed circuit board has a predefined layout of the first and second physical communication links with predefined widths, wherein the different link bifurcations and the different internal routing of connections in the connectivity switch for each of the configurations are stored prior to the configuration being identified based on the first and second devices;
   when the connectivity switch is in the first configuration, providing a single link between the first device and the first processor and a single link between the second device and the second processor without any other links; and
   when the connectivity switch is in the second configuration:
     providing a direct link between the first device and the second device;
     providing a first link between the first device and the first processor; and
     providing a second link between the second device and the second processor.

9. The method of claim 8, further comprising:
   determining, by a controller, a device type of the first and second devices; and
   storing the device type in a configuration map of a computer memory.

10. The method of claim 9, further comprising:
receiving, by the baseboard management controller, the device type of the first and second devices from the controller, wherein the device type is part of the setup of the first and second devices; and
creating the connectivity indication signal based on the device type of the first and second devices.

11. The method of claim 8, further comprising:
in response to the connectivity indication signal indicating the third configuration, operating the connectivity switch in the third configuration,
wherein when the connectivity switch is in the third configuration, the method further comprises:
providing a first link between the first device and the second processor;
providing a second link between the second device and the first processor;
providing a third link between the first device and the first processor; and
providing a fourth link between the second device and the second processor.

12. The method of claim 8, wherein the first and second devices are peripheral component interconnect express devices.

13. The method of claim 8, wherein the first and second devices are field programmable gate array devices.

14. The method of claim 8, wherein the first and second devices are special needs application program interface peripheral component interconnect express devices.

15. An information handling system, comprising:
a planar portion including:
first and second processors;
a computer memory; and
a baseboard management controller to communicate with the computer memory; and
a riser printed circuit board having a predefined layout of first and second physical communication links with predefined widths, the riser printed circuit board including:
first and second devices configured to communicate with the first and second processors, the first device to communicate via the first physical communication link and the second device to communicate via the second physical communication link;
a connectivity switch connected between the first and second devices and the first and second processors, the connectivity switch configured to operate in one of a plurality of configurations, the plurality of configuration includes a first configuration, a second configuration, and a third configuration, wherein each of the configurations provides different internal routing of connections in the connectivity switch for different connectivity between the first device, the second device, the first processor, and the second processor, wherein the first configuration of the connectivity switch provides a single link between the first device and the first processor and a single link between the second device and the second processor without any other links, wherein the second configuration of the connectivity switch provides a direct link between the first device and the second device, a first link between the first device and the first processor, and a second link between the second device and the second processor, wherein each of the configurations provides a different bifurcation of the first and second physical communication links for communication among the first device, the second device, the first processor, and the second processor, wherein the different link bifurcations and the different internal routing of connections in the connectivity switch for each of the configurations are stored prior to the configuration being identified based on the first and second devices;
a controller to determine a setup of the first and second devices, and to store the setup in a configuration map within the computer memory; and
the baseboard management controller to communicate with the connectivity switch, the baseboard management controller to:
access the setup of the first and second devices from the computer memory; and
provide a connectivity indication signal to the connectivity switch based on the setup of the first and second devices, wherein the connectivity indication signal identifies one of the configurations for the connectivity switch.

16. The information handling system of claim 15, wherein the third configuration of the connectivity switch provides a first link between the first device and the second processor, a second link between the second device and the first processor, a third link between the first device and the first processor, and a fourth link between the second device and the second processor.

* * * * *